United States Patent [19]

Ito et al.

[11] Patent Number: 5,270,095
[45] Date of Patent: Dec. 14, 1993

[54] MEMBER FOR A HONEYCOMB CORE OR PANEL REQUIRING SIMPLE AND COMPOUND CURVATURES

[75] Inventors: Yasunaga Ito; Yoshimasa Uozumi, both of Nagoya, Japan

[73] Assignee: Sumitomo Light Metal Industries, Ltd., Japan

[21] Appl. No.: 803,099

[22] Filed: Dec. 5, 1991

[30] Foreign Application Priority Data

Dec. 18, 1990 [JP]  Japan .................................. 2-403324

[51] Int. Cl.$^5$ .............................................. B32B 3/12
[52] U.S. Cl. ................................. 428/116; 428/102; 428/178; 428/212; 428/593; 52/806; 52/808; 156/196; 156/197; 156/209; 228/181
[58] Field of Search .............. 428/116, 119, 120, 174, 428/188, 178, 33, 102, 130, 212, 593; 29/455.1; 228/181; 156/196, 197, 209; 52/785, 800, 806, 808

[56] References Cited

U.S. PATENT DOCUMENTS

| | | | |
|---|---|---|---|
| 2,050,074 | 8/1936 | Trytten | 428/182 |
| 3,068,565 | 12/1962 | King | 29/472.3 |
| 3,432,379 | 7/1969 | Anderson | 161/68 |
| 4,461,796 | 7/1984 | Fukahori et al. | 116/428 |

FOREIGN PATENT DOCUMENTS

| | | |
|---|---|---|
| 2147598 | 7/1972 | France . |
| 58-25531 | 5/1983 | Japan . |
| 2117679 | 12/1982 | United Kingdom . |

OTHER PUBLICATIONS

Design and Development/Scanning the Field for Ideas, vol. 36, No. 17, Jul. 16, 1984, p. 144, "Pleats Permit Honeycomb Flexing".
Showa Aircraft Ind. Co., Ltd., vol. 14, No. 206 (M-096), Apr. 26, 1990 and JP-A-2 043 031.

*Primary Examiner*—Donald J. Loney
*Attorney, Agent, or Firm*—Davis, Bujold & Streck

[57] ABSTRACT

A member for a honeycomb core or panel that can be bent with various radii of curvature, can contour a compound curvature and can support a load perpendicular to the defined curvature. The honeycomb member, preferably, has cells having an equilateral triangular cross section. The cells are defined by rectangular bottom, top and side faces. The connecting angle between each bottom face and each side face is typically about 60 degrees. The adjoining sides of the bottom faces contact each other. The adjoining sides of the top faces also contact each other. Although the cells contain a small orifice between adjoining sides, the cells have the same strength as that of completely enclosed cells. Furthermore, the relative position of the adjoining cells can be easily altered.

22 Claims, 10 Drawing Sheets

FIG. 5A
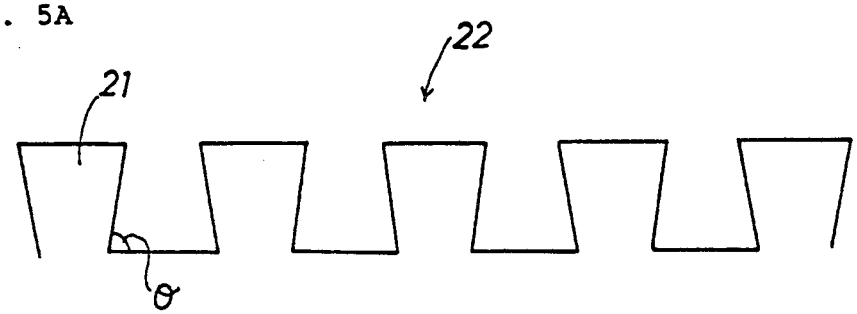
FIG. 5B
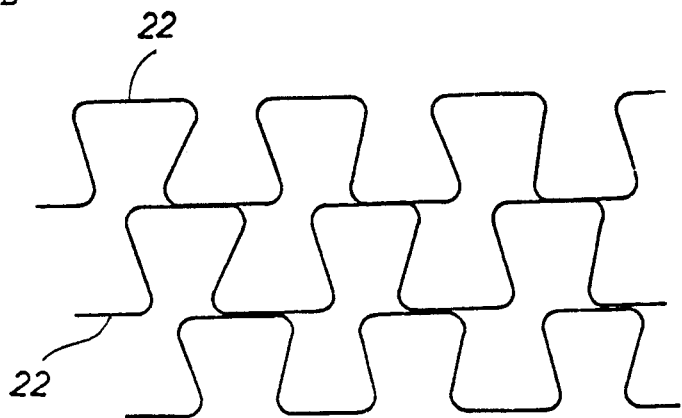
FIG. 5C
FIG. 5D
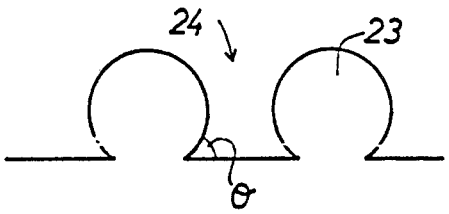
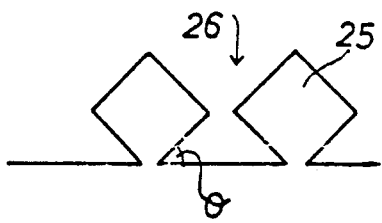
FIG. 5E
FIG. 5F
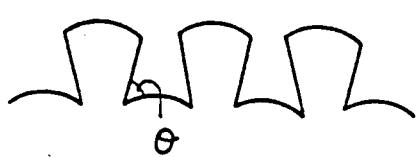
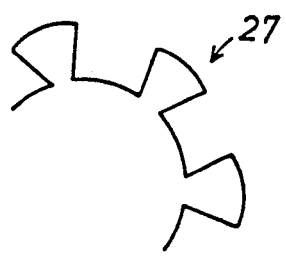
FIG. 5G
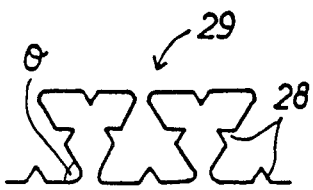

MEMBER FOR A HONEYCOMB CORE OR PANEL REQUIRING SIMPLE AND COMPOUND CURVATURES

BACKGROUND OF THE INVENTION

This invention relates to a honeycomb member for a honeycomb core or panel. By using a single honeycomb member or by the arrangement of multiple honeycomb members, a honeycomb core or panel can be formed.

Typically, a honeycomb core is composed of a plurality of dense close ended cells and can be used as core material for a flat honeycomb panel. The cells typically have a hexagonal or square cross section. When a honeycomb core or panel is used for various structural applications, curved configurations are often required. A curved honeycomb core or panel is generally manufactured by merely bending plate material, but other known methods for manufacturing a curved honeycomb core or panel also exist and are now explained.

As shown in FIG. 9, flexible honeycomb core members composed of cells defined by curved faces are manufactured. The honeycomb core members are then adhered, soldered or welded to one another along a desired curvature to form a honeycomb core.

A second known method, shown in FIG. 10, depicts a plurality of strip materials 101 which are bonded together by applying adhesive onto hatched portions 102 and then formed into a lamination 103. After a cross-hatched portion 104 is removed from the lamination 103, the lamination 103 is extended to form a curved honeycomb core 105. The curved honeycomb core 105 is then sandwiched and bonded between face plates 106 and 107 to produce a curved honeycomb panel.

Japanese Laid-Open Patent Publication No. 58-25531 discloses another method as shown in FIGS. 11A through 11D. A strip material 111 is folded along folding lines 112 and 113. As shown in FIG. 11A, the folding lines 112 are perpendicular to a center line CL, and the folding lines 113 are slanted in relation to the center line CL. The strip material 111 is then folded along the folding lines 112 and 113 to form a corrugated sheet 116. As shown in FIGS. 11B and 11C, the corrugated sheet 116 has inclined ridges 114 and grooves 115. As shown in FIG. 11D, when the corrugated sheet 116 is overlapped with one another corrugated sheet, the ridges 114 of one corrugated sheet 116 are attached onto the grooves 115 of another corrugated sheet 116 through spot welding, thereby defining hexagonal cells 118 thus creating a curved honeycomb core 117.

The aforementioned related-art methods for manufacturing curved honeycomb cores or panels have many problems. In the first-explained related-art method, when a curved honeycomb core is manufactured by bending the plate material, the honeycomb core resists against the force required to bend it, thus permitting only large radii of curvature. Small radii of curvature cannot be obtained, using this method.

In the second related-art method shown in FIG. 9, the materials of the honeycomb cores have such a special configuration that positioning of the materials for forming cells is troublesome when the honeycomb cores are laminated onto one another. The production time is thereby significantly increased, moreover, the desired honeycomb core becomes more difficult to form as its height increases, due to the required curvature.

The second related-art method, shown in FIG. 10, involves multiple process steps, which increase production time. Furthermore, the honeycomb core 105 is not adequately supported perpendicular to its defined curvature, therefore the honeycomb panel produced has insufficient strength.

In the last related-art method shown in FIGS. 11A through 11D, it is difficult to form the corrugated sheet 116 by folding the strip material 111 along the folding lines 112 and 113. It is also troublesome to form the cells 118 having hexagonal cross section by positioning and attaching the corrugated sheets 116. Additionally, the corrugated sheets 116 are bent with only a limited radius of curvature. This method, as defined, is insufficient to provide honeycomb cores or panels having varying radii of curvature.

SUMMARY OF THE INVENTION

An object of this invention is to provide a honeycomb member that is easily produced, can be bent with various radii of curvature, can be contoured into complicated configurations such as compound curvatures, composed of multiple continuous curves, and can form a honeycomb core or panel that is supported perpendicular to its curvature.

To attain this or other objects, this invention provides a honeycomb member comprising axial faces spaced along the length of the member, composed of flat or curved rectangular faces and further is defined by sides that are perpendicular to the length of the honeycomb member and arranged at specified intervals. The honeycomb member further comprises a plurality of cells extending between the adjoining sides of the axially spaced faces. In the honeycomb member cells are connected to the axial faces and forming acute angles at their juncture while the adjoining sides of each of the axial faces can contact one another.

The axially spaced faces comprise a flat rectangular face. The cells also comprise a second set of axially spaced faces, each comprising a flat rectangular face parallel to the flat rectangular face of the first set of axially spaced faces, and adjoining faces for connecting the adjoining faces of the second set of axially spaced faces with the adjoining faces of the first set of axially spaced faces.

In a honeycomb member according to another embodiment of the present invention, both sets of axially spaced faces each comprise a plurality of flat rectangular faces. The adjoining sides of the first set of faces contact each other and/or the adjoining sides of the second set of faces can also contact each other. The cells extending between the adjoining sides of the first set of faces have a section corresponding to an isosceles or equilateral triangle whose base corresponds to a corresponding face of the second set of axially spaced faces of the honeycomb member.

According to the present invention, since the cells in the honeycomb member extend from the first set of axially spaced faces with an acute angle, the orifice in the cells is small. When the adjoining sides of these faces contact each other, the cells can act as though they are completely enclosed. Since the cells are continuous from the first set of axially spaced faces, forming an acute angle therewith, the angular portion between the cells and these faces is so rigid that the orifice in the cells is quite resistant to opening when subjected to any external force. As a result, the honeycomb member, according to the present invention, has the same capacity of supporting a vertical bearing load as that of a honeycomb member that is composed of completely closed cells. The honeycomb member, according to the present invention, is an adequate reinforcement, in that the cells are hard to deform.

The related-art honeycomb members must be laminated and bonded onto one another to form cells. Therefore, to form a honeycomb panel, multiple honeycomb members need to be specifically arranged. The honeycomb member, according to the present invention, however, utilizes individual cells each of which can independently resist external forces. Consequently, multiple honeycomb members need not to be specifically ordered to form a honeycomb core.

The structure and function of a honeycomb member according to the invention are now explained.

As shown in FIGS. 1A and 1B, each cell 4 in a honeycomb member 5 is defined by a series of bottom faces 1 or top faces 2, and wall faces 3. Each of the bottom, top and wall faces 1, 2 and 3 has a rectangular surface and creates an equilateral triangular cross section for each cell 4. A connecting angle $\theta$ between each bottom face 1 and each wall face 3 is about 60 degrees. In the honeycomb member 5, each cell 4 is rowed such that bottom faces 1 are arraned with corners 1a and 1b between adjacent cells 4 and having a slight clearance and such that top faces 2 are arranged with corners 2a and 2b between adjacent cells 4 with a slight clearance. Since the connecting angle $\theta$ between wall faces and each of the top or bottom faces is acute, each cell 4 is formed having sufficient load-bearing strength.

As shown in FIG. 1C, the honeycomb members 5 are combined with one another to form a final product of a honeycomb panel or core. Since the honeycomb members 5 have defined cells 4, they can be arranged without having to bond them to one another. In the related art, honeycomb members must be bonded to one another to form a core or panel. However, according to the present invention, the honeycomb members 5 as well as the cells 4 can adjoin without bonding. Therefore, the relative position of adjoining cells 4 can be easily changed. As shown in FIGS. 2A through 2C, the honeycomb member 5 can also contour any curve.

As shown in FIGS. 2A and 2B, when the honeycomb member 5 is bent to form a radius of curvature, adjoining corners 1a and 1b contact each other to form support points 6. The honeycomb member 5 can then be bent flexibly in any direction on the support points 6. The support points 6, therefore, assure the stable flexibility of the honeycomb member 5. When the honeycomb member 5 is bent to a radius of curvature as shown in FIG. 2C, adjoining corners 1a and 1b contact each other to form support lines 7. These support lines 7 also assure the stable flexibility of the honeycomb member 5. The connecting angle $\theta$ is so acute that either support points 6 or support lines 7 offer adequate and stable flexibility to the honeycomb member 5, even when the bottom faces 1, the top faces 2 and the wall faces 3 are thin. When the final products are manufactured, specified points P can be soldered.

In the honeycomb member 5, the interval between adjoining corners 1a and 1b is narrow and the cell 4 has a slight clearance therein. The honeycomb member 5 can be bent in such a direction that the adjoining corners 1a and 1b will contact each other. Therefore, the bend direction of the entire honeycomb member 5 is settled. The honeycomb member 5 can bend flexibly along support points 6 and lines 7. When the honeycomb member 5 is bent, the bottom faces 1 define an inner bend radius.

The cells composing a related-art honeycomb member have a large orifice therein. When the related-art honeycomb member is bent as shown in FIG. 2A, the cells would be turned in any direction, thereby dispersing bend force. The bend direction is thus unsettled.

As aforementioned, the honeycomb member 5 can be bent as shown in FIGS. 2A and 2B. Before the honeycomb member 5 is soldered to a face plate to form a honeycomb panel, the honeycomb member 5 can also be bent as follows.

As shown in FIGS. 3A and 3B, upon bending the honeycomb member 5, an outer radius R1 and an inner radius R2 are formed. When L denotes the length of the bottom face 1, the bend limitation of the honeycomb member 5 can be determined by means of the following equations.

$$R1 = (d1/2) + (L^2/8d1)$$

$$R2 = -(d2/2) + (L^2/8d2)$$

In the above equations d1 and d2 denote clearances as shown in FIGS. 3A and 3B. Limit clearances are substituted for d1 and d2. The limit clearances are requirements for soldering the honeycomb member 5 onto a face plate. As shown in the above equations, by adjusting the length L of the bottom face 1, small radii of curvature can be permitted. To further decrease the radius of curvature, both ends of each bottom face 1 of the honeycomb member 5 can be trimmed according to the curvature of a face plate, thereby minimizing the clearances d1 and d2.

As shown in FIGS. 4A and 4B, a honeycomb member can also be twisted about the axis defining its length. The hatched portion of the strip material for a honeycomb member can be cut out. The strip material is then folded along folding lines a through i to form a honeycomb member as shown in FIG. 4C. This honeycomb member can contact a face plate with only slight clearance therebetween. Therefore, as long as the folding lines a through i are perpendicular to the length of the honeycomb member 5, the bottom faces 1, the top faces 2 and the wall faces 3 are not limited to a rectangular cross section. By cutting the part of the strip material to obtain an appropriate curve, a honeycomb member can be soldered to a face plate easily, thereby following the configuration of a honeycomb panel.

As aforementioned, the honeycomb member according to this invention can be bent or twisted to various radii of curvature. In a honeycomb core composed of the honeycomb member, the load-bearing force acts perpendicularly to the curved surface of the honeycomb core.

When a honeycomb panel is manufactured, a panel is first pressed to a desired curvature; the honeycomb member of this invention is then arranged onto a panel, and a face plate is fit onto the honeycomb member. Through simple manufacturing steps, the honeycomb member can be bent or twisted as desired. Consequently, a honeycomb panel having a complicated set of curvatures can be easily manufactured. Since the sizes of the cells composing the honeycomb member are easily adjusted, the wall thickness, the cell heights and the curvature of the honeycomb core as well as other parameters can each be easily adjusted. Therefore, a honeycomb core or panel having desired strength can be easily manufactured. A honeycomb member can also be manufactured by folding a strip member along a series of parallel folding lines. When a honeycomb core or panel is composed of the honeycomb member 5, as shown in FIGS. 1A through 1C, the cells 4 having a uniform equilateral triangular cross section offer balanced strength to the honeycomb core or panel.

The cells of a honeycomb member can alternately have an isosceles triangular or other shaped cross section. For example, per FIGS. 5A and 5B, cells 21 can have a trapezoidal cross section and compose a honeycomb member 22. FIG. 5C provides for cells 23 having a circular cross section and composing a honeycomb member 24. As shown in FIG. 5D, cells 25 can have a square cross section and form a honeycomb member 26. As shown in FIG. 5E, in a honeycomb member 27, curved top faces and bottom faces can also define cells. When the honeycomb member 27 is bent along the curvature of a face plate as shown in FIG. 4C, the honeycomb member 27 can be soldered to the face plate with slight clearance therebetween, thereby permitting small, theoretically several microns or smaller radius of curvature as shown in FIG. 5F. In a honeycomb member 29, per FIG. 5G, the top faces, wall faces and bottom faces of cells can include folded reinforcement ribs 28 for strengthening the honeycomb member 29. In the honeycomb members 22, 24, 26, 27 and 29 the connecting angle $\theta$ between each wall face and each bottom face of each cell is acute. Therefore, the honeycomb members 22, 24, 26, 27 and 29 offer the same effects as those of the honeycomb member 5 composed of the cells 4.

BRIEF DESCRIPTION OF THE DRAWINGS

FIGS. 5A through 5G are cross-sectional views illustrating the configuration of the cells of the honeycomb member.

DETAILED DESCRIPTION OF THE PREFERRED EMBODIMENTS

Figure 1A:
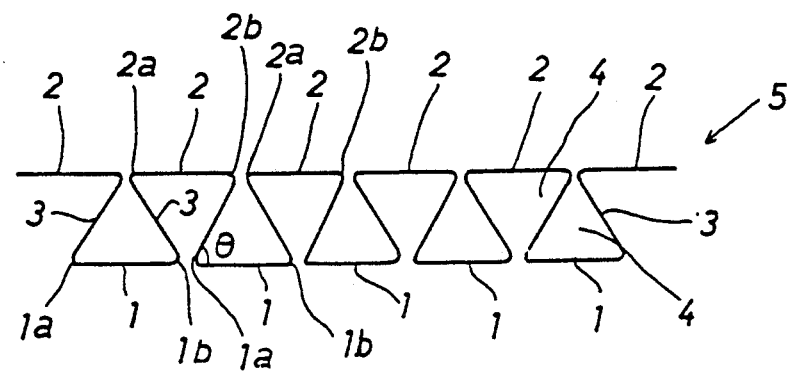
FIGS. 1A through 1C are explanatory views of a honeycomb member according to this invention.
Figure 1B:
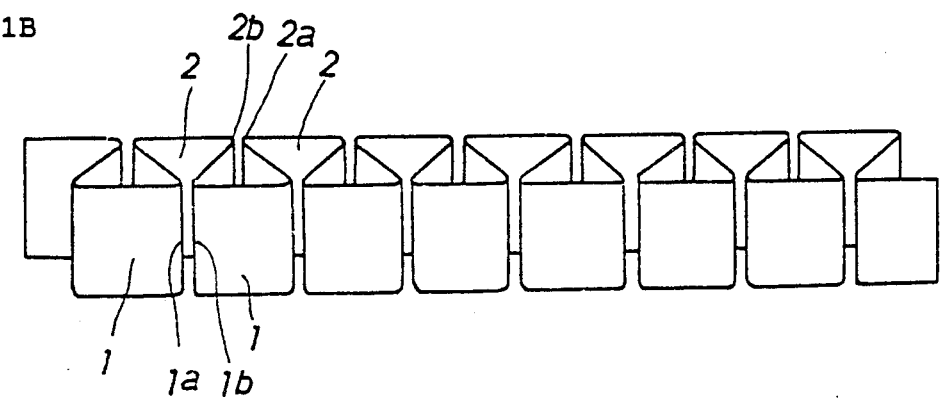
Figure 1C:
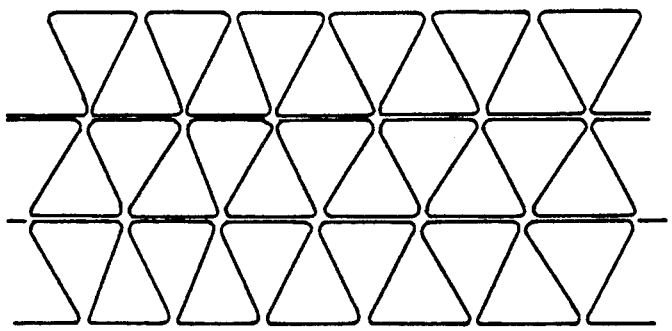
Figure 6A:
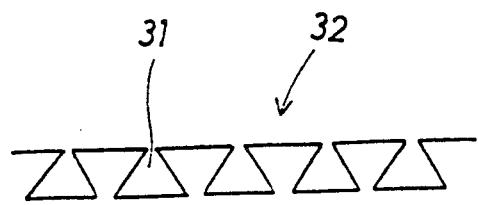
FIGS. 6A through 6C are explanatory views of the honeycomb member of the first embodiment.

A first embodiment will now be explained with reference to FIGS. 6A through 6C. In the first embodiment, cells 31 having an equilateral triangular cross section compose a honeycomb member 32, in the same way as the honeycomb member 5 composed of the cells 4 explained above and shown in FIGS. 1A through 1C. The honeycomb member 32 can be used in honeycomb panels having a variety of curvatures. In this embodiment, aluminum strip material is folded to form the honeycomb member 32, such that three 11 mm long sides define the cells 31. The aluminum strip material has a thickness of 0.2 mm and a width of 13 mm.

Figure 6B:
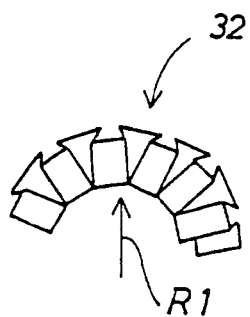
Figure 6C:
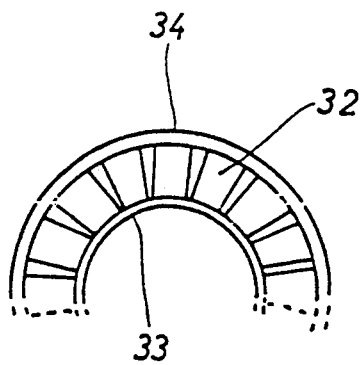

As shown in FIG. 6B, the honeycomb member 32 is first bent such that an inner radius Ri is 50 mm. As shown in FIG. 6C, face plates 33 and 34 are then soldered to the inner and outer peripheries of the honeycomb member 32, respectively, thereby forming a honeycomb panel. The honeycomb member 32 can be bent flexibly and then soldered in place to follow the curvature of the face plates 33 and 34. The load-bearing force of the honeycomb member 32 acts perpendicularly to the radius of curvature of the face plates 33 and 34, thereby providing adequate strength.

Figure 7A:
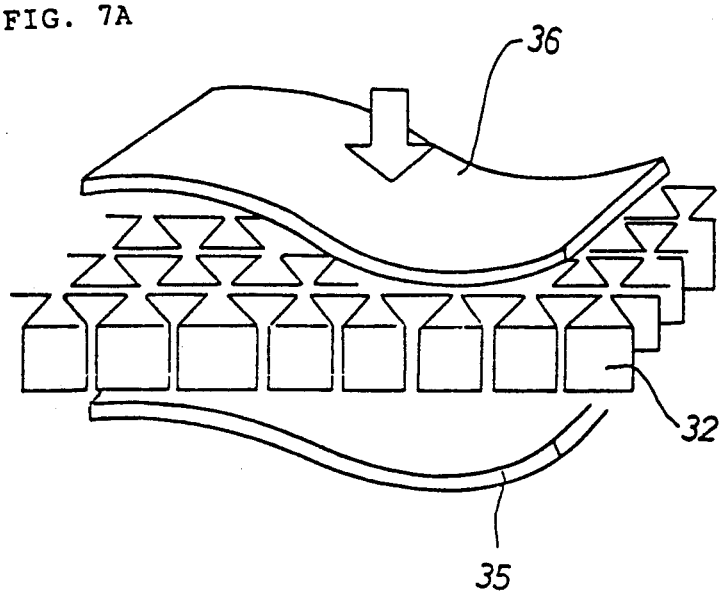
FIGS. 7A and 7B are explanatory views of the honeycomb member of the second embodiment.
Figure 7B:
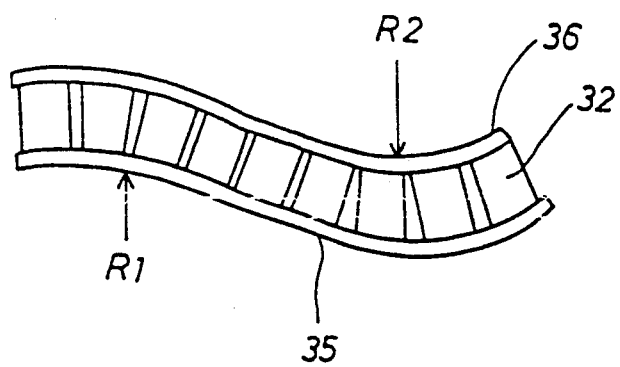

A second embodiment will now be explained with reference to FIGS. 7A and 7B. In this embodiment, the honeycomb member 32 of the first embodiment is formed into a honeycomb panel having a compound curvature. The honeycomb member 32 is then assembled and soldered between face plates 35 and 36. The face plates 35 and 36 are pressed in advance to have a compound curvature. As shown in FIG. 7B, the compound curvature consists of a convex curvature followed by a concave curvature. The convex curvature has an inner radius R1 of 70 mm and the concave curvature has an inner radius R2 of 45 mm. In this embodiment, the honeycomb member 32 follows the compound curvature of the honeycomb panel. The honeycomb member 32 is securely soldered between the face plates 35 and 36. The load-bearing force of the honeycomb member 32 acts perpendicularly to the compound radii of curvature, thereby offering adequate strength, for example a compressive strength of about 0.7 kgf/mm$^2$ to the honeycomb panel.

Figure 2A:
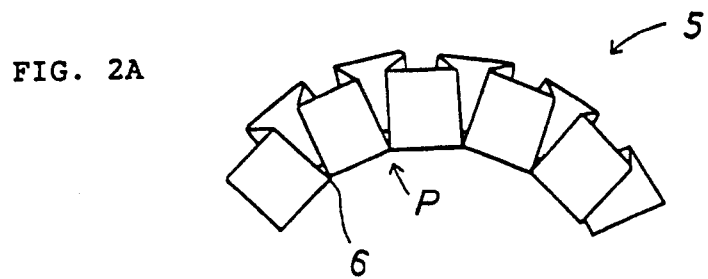
FIGS. 2A through 2C are explanatory views of the honeycomb member bent for use.
Figure 2B:
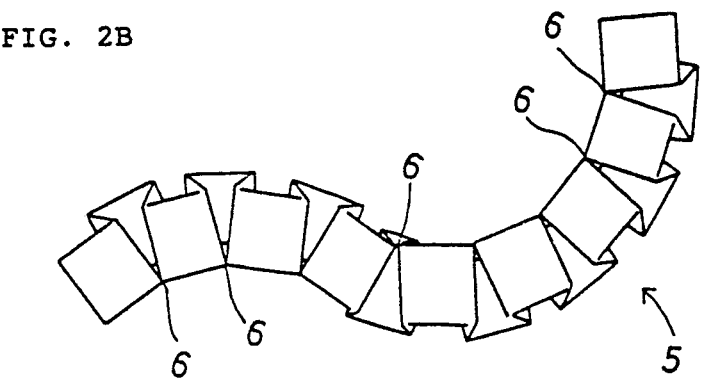
Figure 2C:
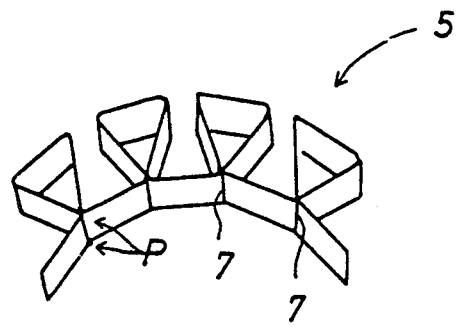
Figure 3A:
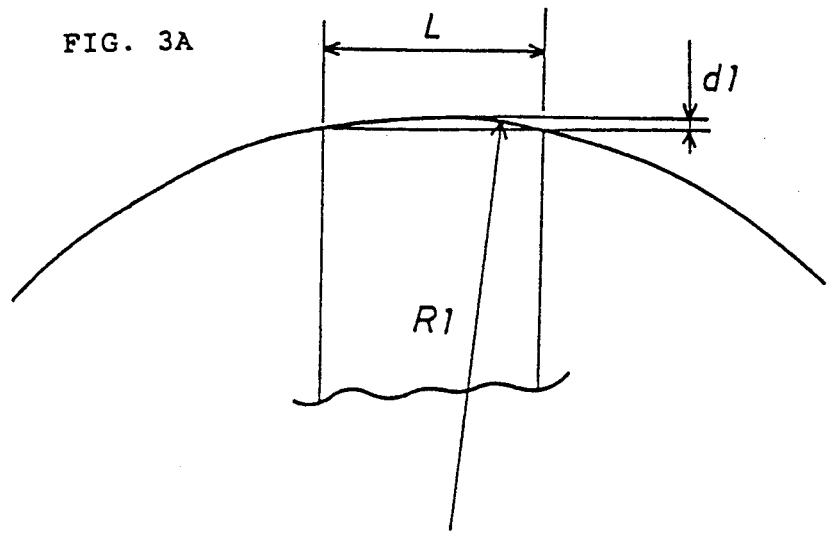
FIGS. 3A and 3B are explanatory views showing inner and outer radii formed when the honeycomb member is bent.
Figure 3B:
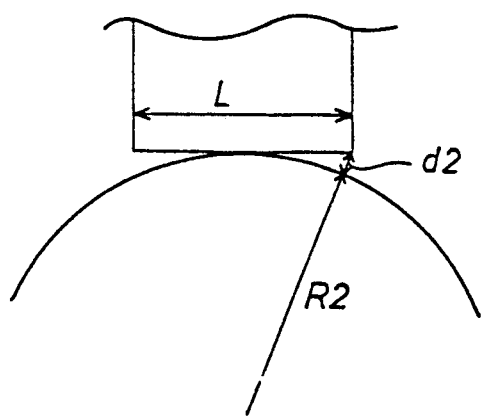
Figure 4A:
FIGS. 4A through 4C are explanatory views explaining the flexibility of the honeycomb member according to this invention.
Figure 4B:
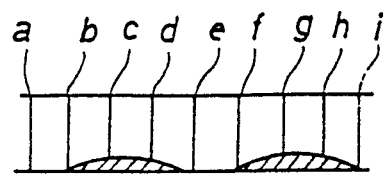
Figure 4C:
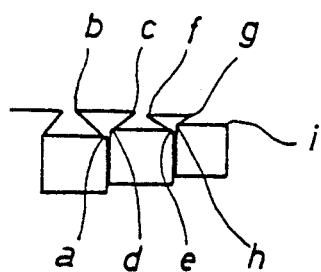
Figure 8:
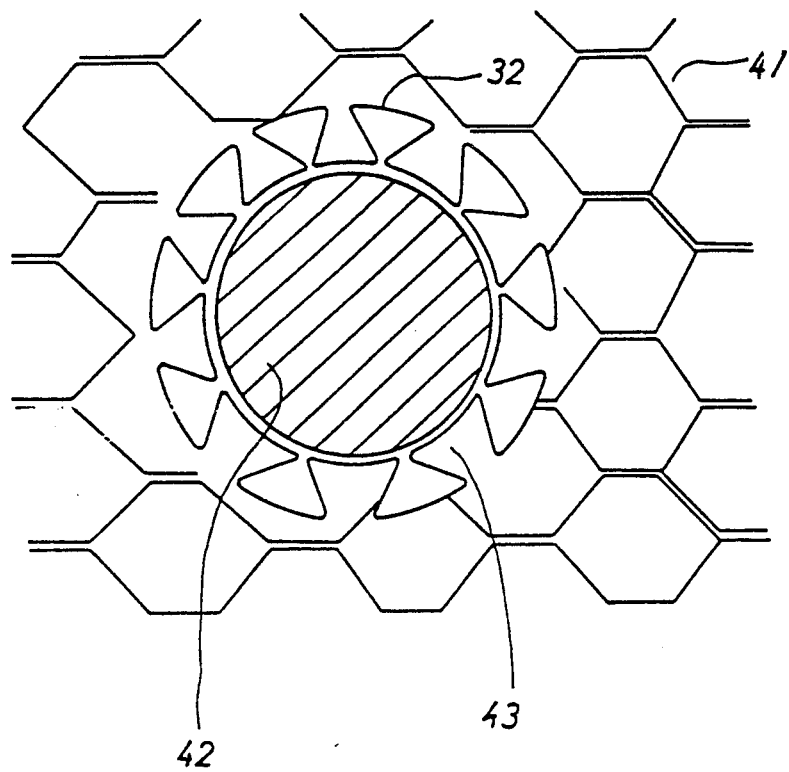
FIG. 8 is an explanatory view of the honeycomb member of the third embodiment.
Figure 9:
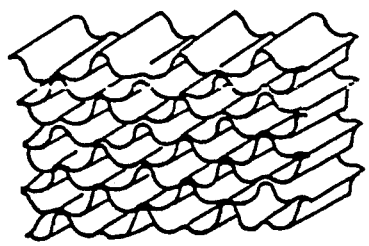
FIG. 9 is a perspective view of a related-art honeycomb member.
Figure 10:
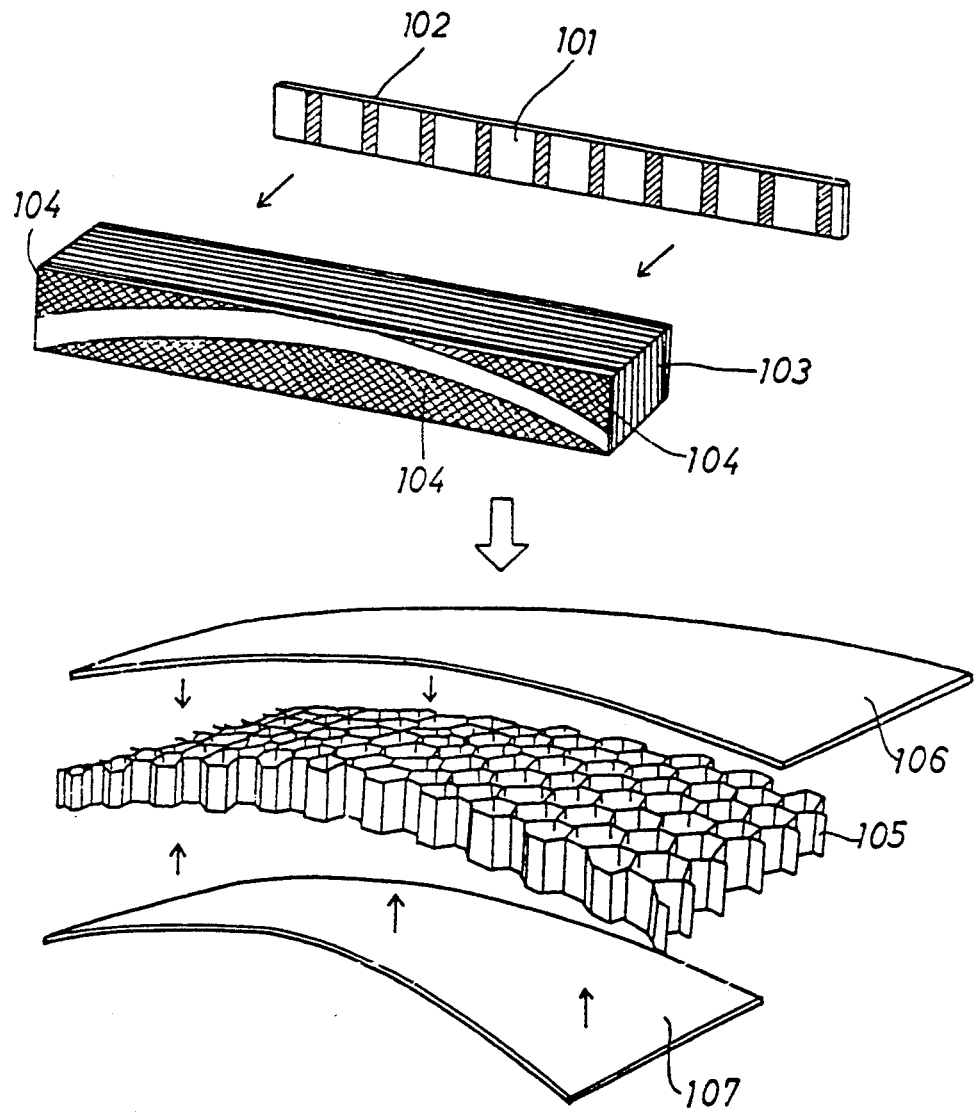
FIG. 10 is an explanatory view showing the formation of the curvature from a related-art honeycomb member.
Figure 11A:
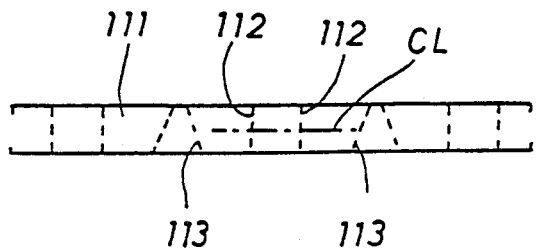
FIGS. 11A through 11D are explanatory views illustrating a related-art honeycomb member.
Figure 11B:
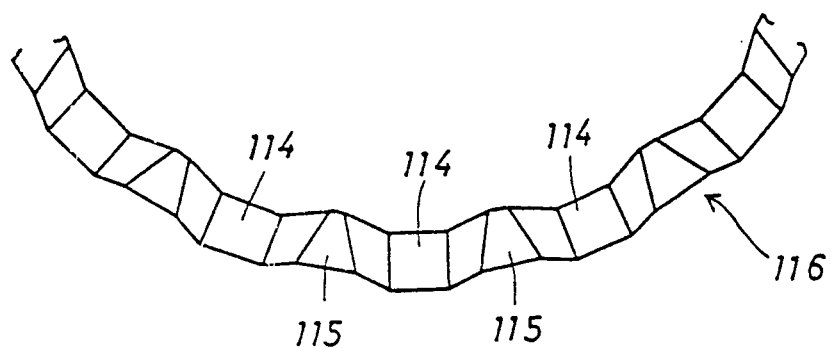
Figure 11C:
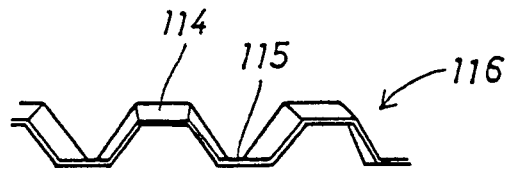
Figure 11D:
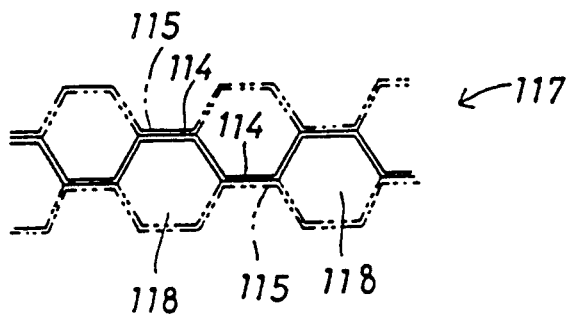

A third embodiment will now be explained with reference to FIG. 8. In this embodiment the honeycomb member 32 is bent as shown in FIG. 2C to form a spacer between a honeycomb core 41 and an aluminum block 42 in a honeycomb panel. The honeycomb core 41 is composed of known cells having a hexagonal cross section. A screw thread (not shown) is provided in the aluminum block 42.

A bore 43 is made in the honeycomb core 41 to receive the aluminum block 42. The honeycomb member 32 is bent and wound around the aluminum block 42. The aluminum block 42 is then inserted into the bore 43. The honeycomb member 32 secures the aluminum block 42 in the honeycomb panel and strengthens the portion between the aluminum block 42 and the honeycomb core 41. The honeycomb member 32 can thus be used as an individual reinforcement due to its rigidity. At the same time, the honeycomb member 32 can contour any curve of the panel.

Since the honeycomb member 32 fills the portion between the aluminum block 42 and the honeycomb core 41, this portion has the same strength as the other portions of the honeycomb panel and is more resistant to breakage. The honeycomb member 32 could also be wound around the aluminum block 42 in several layers without having to bond the layers to one another.

This invention has been described above with reference to preferred embodiments as shown in the drawings. Modifications and alterations may become apparent to one skilled in the art upon reading and understanding the specification. Despite the use of the embodiment for illustration purposes, however, it is intended to include all such modifications and alterations within the scope and spirit of the appended claims.

In this spirit, it should also be noted that FIGS. 5A through 5G show the cross sections of various configurations the honeycomb cells have. The cross section of the cells, however, is not restricted to these configurations. The connecting angle between the cell walls and bottom faces, however, is preferably acute. Since the cross section of the cells is not limited to that of an equilateral triangle, the cells can have an orifice therein. Furthermore, the material of the honeycomb member is not limited to the specified material.

Wherefore, having thus described the present invention, what is claimed is:

1. A honeycomb member for interconnecting a pair of first and second spaced apart substantially parallel face members, said honeycomb member being elongate and being deformed firstly into a configuration defining a plurality of sequentially arranged cells, each of said plurality of sequentially arranged cells being separated by a rectangular face having opposed side edges, and said honeycomb member being deformed secondly so that at least a portion of the side edges of adjacent rectangular faces of that elongate honeycomb member contact one another.

2. A honeycomb panel comprising a pair of first and second spaced apart substantially parallel face members, each of said first and second face members extending axially along an axial length of said honeycomb panel, said first and second face members being interconnected by a plurality of elongate honeycomb members, each of said plurality of elongate honeycomb members being deformed firstly into a configuration defining a plurality of sequentially arranged cells, said plurality of sequentially arranged cells of each honeycomb member being separated by a rectangular face having opposed side edges, and each of said plurality of elongate honeycomb members being deformed secondly so that at least a portion of the side edges of adjacent rectangular faces of each said honeycomb member are brought into contact with one another.

3. A honeycomb panel according to claim 2 wherein the entire surface of each said honeycomb member extends substantially perpendicular to planes defined by both of said first and second face members.

4. A honeycomb panel according to claim 3 wherein each of said rectangular faces is flat.

5. A honeycomb panel according to claim 4 wherein each said cell of said plurality of cells has a substantially triangular transverse cross-section.

6. A honeycomb panel according to claim 5 wherein the triangular transverse cross-section of each cell is one of an equilateral triangle and an isosceles triangle.

7. A honeycomb panel according to claim 3 wherein each rectangular face and the two adjacent sequentially arranged cells separated by that rectangular face form a further cell.

8. A honeycomb panel according to claim 3 wherein the second deformation of each said honeycomb member results in side edges of adjacent rectangular faces contacting one another substantially along their entire side edges so as to define an inner radius.

9. A honeycomb panel according to claim 3 wherein the side edges of the adjacent rectangular faces only have a point contact with one another.

10. A honeycomb panel according to claim 9 wherein each said honeycomb member is twisted about a longitudinal axis defined by said honeycomb member.

11. A honeycomb panel according to claim 3 wherein each honeycomb member is bonded only to said first and second face members without being bonded to adjacent honeycomb members.

12. A honeycomb panel according to claim 11 wherein the non-bonded adjacent honeycomb members facilitate relative movement of one adjacent said honeycomb member relative to another adjacent said honeycomb member.

13. A honeycomb panel according to claim 5 wherein each surface forming the substantially triangular transverse cross-section of each said cell is provided with a folded reinforcement rib for strengthening said honeycomb member.

14. A honeycomb panel according to claim 3 wherein each said cell of said plurality of cells has a substantially rectangular transverse cross-section.

15. A honeycomb panel according to claim 3 wherein each said cell of said plurality of cells has a substantially circular transverse cross-section.

16. A honeycomb panel according to claim 3 wherein each said cell of said plurality of cells has a substantially trapezoidal transverse cross-section.

17. A honeycomb panel according to claim 3 wherein each rectangular face comprises a curved surface.

18. A honeycomb panel according to claim 3 wherein each side edge of a said rectangular face has a sidewall face extending therefrom at an acute angle, and said two sidewalls and that said rectangular face define a further cell being partially open opposite said rectangular face.

19. A honeycomb panel according to claim 18 wherein the partial opening of each further cell facilitates deformation of said honeycomb member so that the honeycomb member readily conforms to the contour of said first and second face members.

20. A honeycomb panel according to claim 3 wherein each said honeycomb member is made from aluminum.

21. A honeycomb member according to claim 1 wherein the second deformation of said honeycomb member results in the side edges of adjacent rectangular faces contacting one another substantially along their entire side edges so as to define the inner radius of said honeycomb member, and said inner radius defining a central bore accommodating a cylindrical block member.

22. A method of making a honeycomb panel comprising a pair of first and second spaced apart substantially parallel face members with each of said first and second face members extending axially along an axial length of said honeycomb structure, said method comprising the steps of:

a) interconnecting said first and second face members by a plurality of elongate honeycomb members, b) deforming each of said plurality of elongate honeycomb members into a configuration defining a plurality of sequentially arranged cells with each of said plurality of sequentially arranged cells being separated from one another by a rectangular face having opposed side edges, and c) deforming each of said plurality of elongate honeycomb members, prior to interconnecting said first and second face members, so that at least a portion of the side edges of adjacent rectangular faces of that elongate honeycomb member are brought into contact with one another.

* * * * *